United States Patent
Pearson et al.

(10) Patent No.: US 8,903,054 B2
(45) Date of Patent: *Dec. 2, 2014

(54) METHODS AND APPARATUS TO PROVIDE A TELEPHONE SYSTEM CONFIGURATION INTERFACE

(71) Applicant: AT&T Intellectual Property I, L.P., Atlanta, GA (US)

(72) Inventors: Larry B. Pearson, San Antonio, TX (US); Jeffrey L. Brandt, Cedar Park, TX (US); Douglas Reynolds, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 114 days.

This patent is subject to a terminal disclaimer.

(21) Appl. No.: 13/763,175

(22) Filed: Feb. 8, 2013

(65) Prior Publication Data

US 2013/0155908 A1 Jun. 20, 2013

Related U.S. Application Data

(63) Continuation of application No. 12/831,090, filed on Jul. 6, 2010, now Pat. No. 8,396,194, which is a continuation of application No. 11/530,578, filed on Sep. 11, 2006, now Pat. No. 7,787,602.

(51) Int. Cl.
*H04M 1/64* (2006.01)
*H04M 3/42* (2006.01)
*H04W 12/02* (2009.01)
*H04M 3/533* (2006.01)

(52) U.S. Cl.
CPC ............ *H04M 1/64* (2013.01); *H04M 3/42161* (2013.01); *H04W 12/02* (2013.01); *H04M 3/53333* (2013.01); *H04M 3/42238* (2013.01)
USPC ...................................... 379/88.21; 379/88.17

(58) Field of Classification Search
CPC ..................... H04M 3/42161; H04M 3/53333; H04M 3/42238; H04W 12/02
USPC ....................... 379/88.17, 88.21, 88.23, 88.25
See application file for complete search history.

(56) References Cited

U.S. PATENT DOCUMENTS 6,031,904 A 2/2000 An et al.
6,091,808 A 7/2000 Wood et al.
(Continued)

OTHER PUBLICATIONS

Notice of Allowance, issued by the United States Patent and Trademark Office in connection with U.S. Appl. No. 11/530,587, mailed Apr. 7, 2010, 5 pages.

(Continued)

*Primary Examiner* — Creighton Smith
(74) *Attorney, Agent, or Firm* — Hanley, Flight & Zimmerman, LLC

(57) ABSTRACT

Methods and apparatus for a telephone customer to configure telephone service for multiple users at a single location associated with the customer. The location has at least two telephones, at least two phone numbers and a voice mail box. The telephone customer is visually provided an option to assign one of the phone numbers to one of the telephones. The telephone customer is visually provided an option to assign each of the multiple users exclusive access to at least one of the telephone numbers via their account identifier. The telephone customer is visually provided the option to, for each of the multiple users, allow access or deny access via their account identifier to the voicemail box.

20 Claims, 10 Drawing Sheets

(56) References Cited

U.S. PATENT DOCUMENTS

| | | |
|---|---|---|
| 6,356,543 B2 | 3/2002 | Hall et al. |
| 6,526,129 B1 | 2/2003 | Beaton et al. |
| 6,529,596 B1 | 3/2003 | Asprey et al. |
| 6,879,666 B2 | 4/2005 | Hickey et al. |
| 7,035,385 B2 | 4/2006 | Levine et al. |
| 7,212,619 B1 | 5/2007 | Gerritse-Van Bavel et al. |
| 2003/0068019 A1 | 4/2003 | Colemon |
| 2004/0133888 A1 | 7/2004 | Ard et al. |
| 2006/0062358 A1 | 3/2006 | Pearson et al. |
| 2007/0121914 A1 | 5/2007 | Pearson et al. |
| 2007/0269023 A1 | 11/2007 | Klauer et al. |

OTHER PUBLICATIONS

Notice of Allowance, issued by the United States Patent and Trademark Office in connection with U.S. Appl. No. 12/831,090, mailed Nov. 7, 2012, 12 pages.

Advisory Action, issued by the United States Patent and Trademark Office in connection with U.S. Appl. No. 12/831,090, mailed Oct. 16, 2012, 3 pages.

Office Action, issued by the United States Patent and Trademark Office in connection with U.S. Appl. No. 12/831,090, mailed Jul. 12, 2012, 4 pages.

Office Action, issued by the United States Patent and Trademark Office in connection with U.S. Appl. No. 12/831,090, mailed Mar. 26, 2012, 4 pages.

METHODS AND APPARATUS TO PROVIDE A TELEPHONE SYSTEM CONFIGURATION INTERFACE

RELATED APPLICATION

This patent arises from a continuation of U.S. patent application Ser. No. 12/831,090, filed on Jul. 6, 2010, which is a continuation of U.S. patent application Ser. No. 11/530,578, filed on Sep. 11, 2006, now U.S. Pat. No. 7,787,602. U.S. patent application Ser. No. 12/831,090 and U.S. patent application Ser. No. 11/530,578 are hereby incorporated herein by reference in their entireties.

FIELD OF THE DISCLOSURE

This disclosure relates generally to telephone systems, and, more particularly, to methods and apparatus to provide a telephone system configuration interface.

BACKGROUND

As the sophistication of phone service has increased, consumers, such as subscribers/users, have the ability to install multiple phones in a residence or small business. Such phones may be land line telephones (i.e., telephones that are hardwired to a telephone network) or may be mobile telephones (e.g., cellular telephones or the like). Additionally, these phones may have multiple shared phone numbers associated with individual phones or each phone may have its own separate private phone number. Further, services such as voicemail boxes may be associated with an individual private phone or shared phones.

The numerous combinations of telephones, telephone numbers, and services must be initially configured to insure that all phone, phone number, and services (e.g., voicemail box options) are properly associated with one another. Furthermore, as the needs of subscribers/users change, the telephones, telephone numbers, and services may need to be reconfigured. In terms of initial configuration, a Consumer Voice over Internet Protocol (CVoIP) product, which routes consumer telephone calls over Internet Protocol (IP) networks requires set up including mapping customer Single Sign-On (SSO) within a household to telephones and voicemail boxes. One challenge is to automate the configuration processes and/or the reconfiguration processes, while at the same time obeying the business rules for CVoIP and voicemail.

Currently, the set up of telephone service, voicemail boxes, etc. for different users in the same household requires expertise from the service provider. This service is costly in terms of resources and creates antagonism by a customer if the service is inadequate or untimely. Further, such service may require information from a customer thereby inconveniencing the customer who must be present when service is initiated. Customers may set up the voicemail and telephone services, but currently customers cannot set up voicemail and telephone services specific to a particular user in a household for whom it is desired to have different services or access to different voicemail boxes. That is, consumer (i.e., home) telephone services provide only a single level of access during which full system access is allowed. For example, a consumer telephone service conventionally includes only a single login that provides any person logging in with the ability to configure or reconfigure systems and/or services. Such a full access-type configuration prevents segmentation between users of a particular consumer system. Thus, users either have complete and total control over the system or no control whatsoever.

DETAILED DESCRIPTION

In general, example methods and apparatus for a telephone system set up interface are disclosed. In one example, a method for providing a telephone related service allowing a telephone subscriber to configure telephone service for multiple users at a single location associated with the telephone subscriber, the single location having a plurality of telephones, a plurality of phone numbers and a shared voicemail box, the multiple users each having a unique account identifier, includes visually providing the telephone subscriber an option to specify one of the phone numbers to one of the telephones; and visually providing the telephone subscriber an option to assign each of the multiple users exclusive access to at least one of the telephone numbers via their account identifier.

Figure 1:
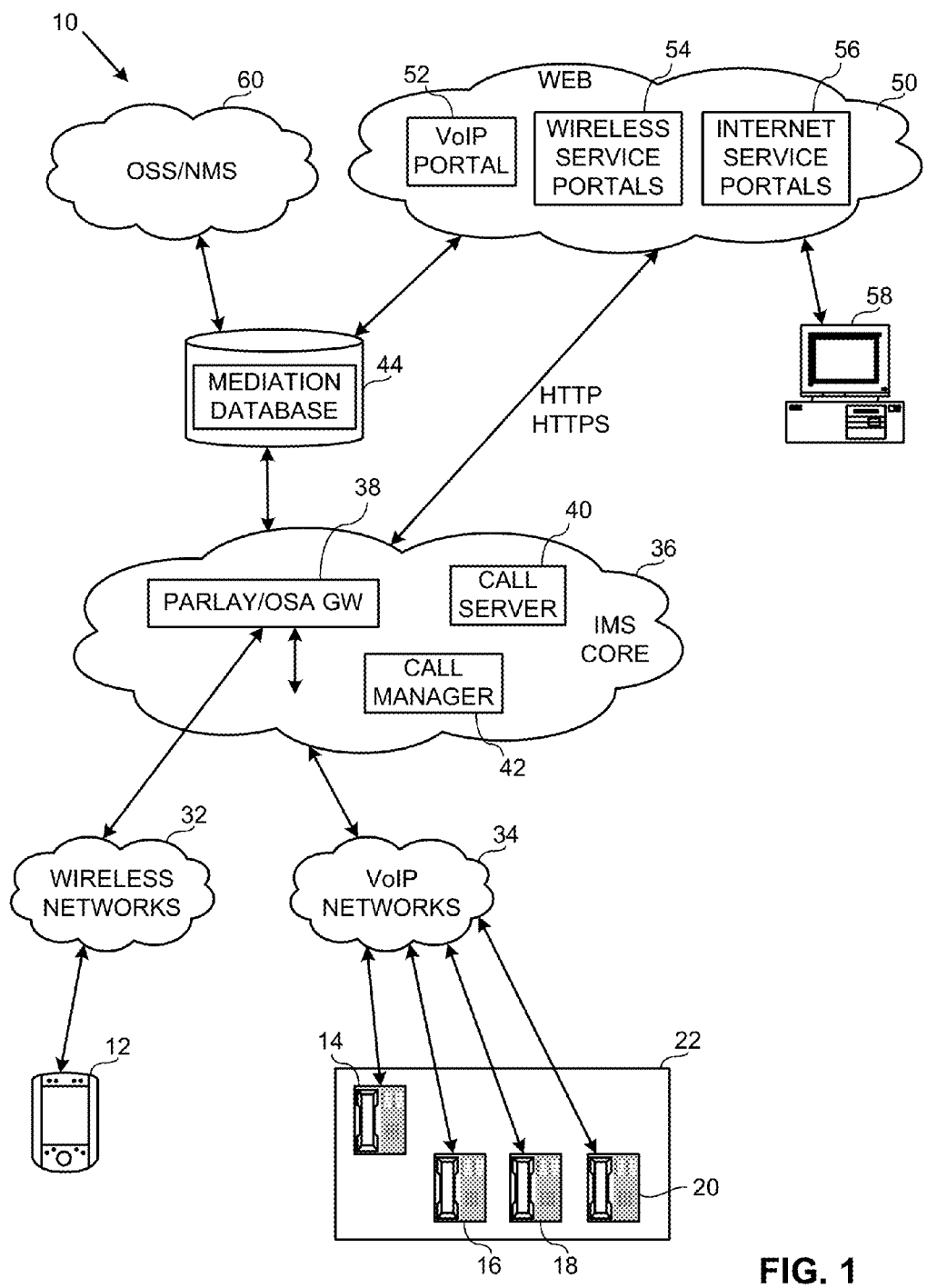
FIG. 1 is a block diagram of an example broadband service network system.

FIG. 1 is a block diagram of an example broadband service network system 10. The broadband service network system 10 allows for the service and operation of multiple communication devices such as a cellular telephone 12 and a Voice over Internet Protocol (VoIP) phone 14, each belonging to a customer or multiple customers. The telephones 12 and 14 are merely for example purposes, and it is to be understood that the cellular phone 12 may be any wireless device such as a cell phone or personal digital assistant (PDA) and the VoIP phone 14 may be any VoIP device such as a sound card or other hardware used in conjunction with a personal computer, a universal serial bus (USB) phone or a Bluetooth wireless phone. It is to be understood by those of ordinary skill in the art that each phone 12 and 14 may represent multiple devices of the same general configuration used by many other customers. The VoIP phone 14 and other devices such as VoIP phones 16, 18 and 20 are located in a customer premises 22. The VoIP phones 14, 16, 18 and 20 each have different assigned phone numbers in this example. It is to be understood, that any number of different phones or other IP based or other communications devices may be installed in the customer premises 22. Alternatively, the customer premises 22 may have a single phone.

The cellular telephone 12 receives signals from and sends signals to a wireless network 32, while the VoIP phones 14, 16, 18 and 20 send to and receive IP signals from a VoIP network 34. In this example, both the wireless network 32 and the VoIP network 34 are coupled to an IP multi-media subsystem (IMS) core 36. The IMS is an open, standardized, operator friendly, Next Generation Networking (NGN) multimedia architecture for mobile and fixed IP services. The IMS in this example is a VoIP implementation based on a third generation partnership project (3GPP) variant of session initiation protocol (SIP), and runs over the standard Internet protocol (IP). It may be used by telecommunications operators in NGN networks that combine voice and data in a single packet switched network, to offer network controlled multimedia services. The IMS core 36 is designed to provide Internet services for all customers of the IMS core 36 on different devices such as the VoIP phone 14 in FIG. 1. The example IMS core 36 uses open standard IP protocols allowing the merger of the Internet with cellular systems, using cellular technologies to provide ubiquitous access and Internet technologies to provide other services.

In this example, the IMS core 36 has an Application Programming Interface (API), which is an open service access (OSA)/gateway (GW) 38, providing an interface for different programs exchanging data. For example the OSA/GW 38 can support telephone protocols (e.g., Parlay) or a multimedia communication protocol (e.g., session initiation protocol (SIP)). Those of ordinary skill in the art will appreciate that different cores may be used for the wireless network 32 and the VoIP network 34.

The example IMS core 36 of FIG. 1 includes a call server 40 and a call manager 42. The call server 40 represents different SIP servers or proxies that are collectively termed CSCF (Call Server Control Function). CSCF elements are used to process SIP signaling packets within the IMS core 36 from the VoIP phones such as the VoIP phones 14, 16, 18 and 20 and perform session control. The call manager 42 provides a web services interface to external applications which are used to set profile information and configure customer phones.

The IMS core 36 is in communication with a mediation database server 44 which stores identification and customer account information used by the IMS core 36. The mediation database server 44 is the master user information database supporting the IMS network elements involved in call processing and sessions. The mediation database server 44 contains profile information, manages user authentication and authorization, and physical SIP endpoint location information. The profile information includes customer account information such as the identity and number of phone users, telephone numbers and voicemail boxes associated with a customer account.

The call manager 42 of the IMS core 36 is coupled via web communication protocols such as hypertext transfer protocol (http) and/or hypertext transfer protocol security (https) to the world wide web 50. The IMS core 36 may draw customer instructions from various portals such as a VoIP service provider portal 52, a wireless service provider portal 54 and an Internet content provider portal 56. Of course, other portals may be provided that allow customers to reset their options for the various services. Different customers may access the portals 52, 54 and 56 via web browser devices such as a personal computer 58. Of course, other web browser capable devices such as cell phones, PDAs, etc. may be used to access the portals 52, 54 and 56.

The mediation database server 44 also communicates with portals such as portals 52, 54 and 56 to send and receive customer information to and from the portals. The mediation database server 44 communicates with an Internet based multi-media support network 60 with a network management system (NMS) and an operational support system (OSS) to support functions such as billing, network management, repairs and servicing. In this example, the network management system is the SBC Lightspeed network, but other network management systems may be used for supporting Internet based multi-media services.

Figure 2A:
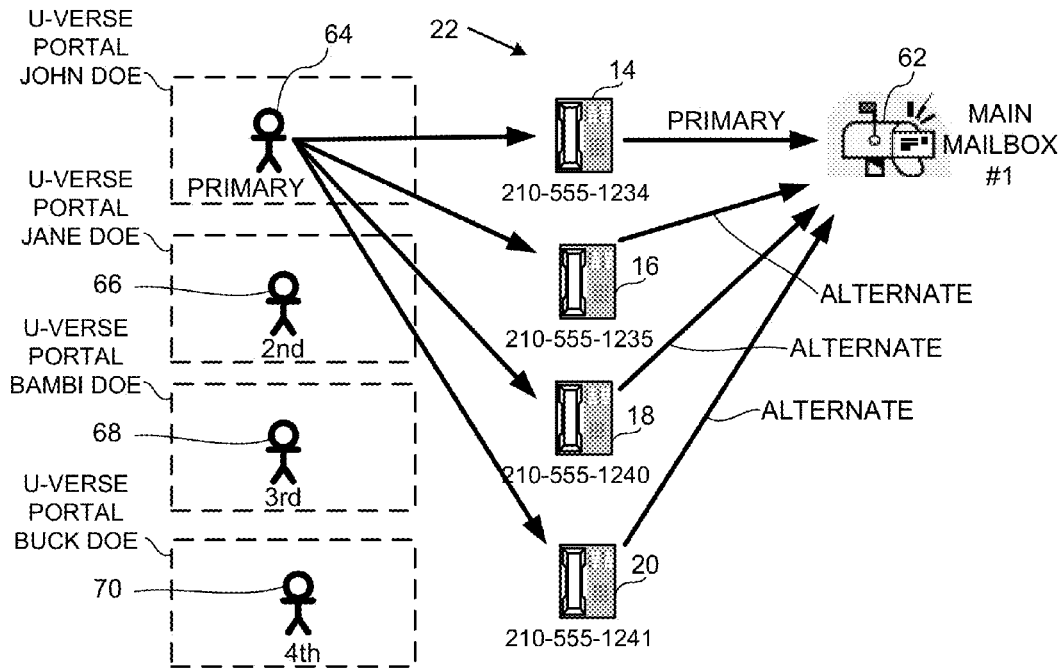
FIG. 2A is a block diagram of an example customer premises in the example broadband service network system of FIG. 1 with the initial installation of example VoIP telephones.

FIG. 2A is a block diagram of an example household such as the customer premises 22 in FIG. 1 after the initial installation of the VoIP phones 14, 16, 18 and 20. In this example, each of the phones 14, 16, 18 and 20 has a separate phone number. Each of the phones 14, 16, 18 and 20 allows access to a common voicemail box 62. Each of the phone numbers is associated with separate users 64, 66, 68 and 70 respectively. The users 64, 66, 68 and 70 are each associated with a customer account with separate identification information such as a user ID stored in the mediation database 42. One user, such as the user 64, is responsible for the customer account (i.e., receives the bills) and thus is authorized to request service changes and configurations for any of the phones 14, 16, 18 and 20 and any of the users 64, 66, 68 and 70. The users 64, 66, 68 and 70 may have access to different telephones such as the phones 14, 16, 18 and 20, different telephone numbers and different voicemail boxes via their customer identification information. Further each of the users 64, 66, 68 and 70 may be granted the ability to change and/or access different telephone features including, for example, long distance service, 1-900 numbers, ringtones, call forwarding and conference calling.

At the initial installation, all features relating to the VoIP phones 14, 16, 18 and 20 are associated with the user 64 for the customer premises 22 and are equally accessible to all of the users 66, 68 and 70 who are associated with the customer account.

As will be described below, a customer such as the user 64 in the example customer premises 22 may use a set up interface to configure the VoIP phones 14, 16, 18 and 20 as well as the voicemail box 62 and set up separate voicemail boxes for each of the persons 64, 66, 68 and 70. The set up interface allows many different configurations of phone numbers, private and public phones, voicemail boxes and greetings and other services to set up the use of the phones 14, 16, 18 and 20 on the customer premises 22 and the access by each of the persons 64, 66, 68 and 70 according to their individual user IDs. The set up interface may also allow the user 64 to grant, deny and/or restrict access to other telephone features and services for each of the other users 66, 68 and 70. Depending on the access granted, each of the other users 66, 68 and 70 may individually configure phone service for their particular identification information. For example, if the user 66 is allowed access to change a voicemail box greeting, the user 66 may change the greeting by providing the proper identification information. The configurations are set via the interface which is available on a web browser device such as the computer 58 in FIG. 1 by accessing a portal such as the VoIP service provider portal 52 and are storing the configurations in the mediation database 44 for implementation by the IMS core 36.

Figure 2B:
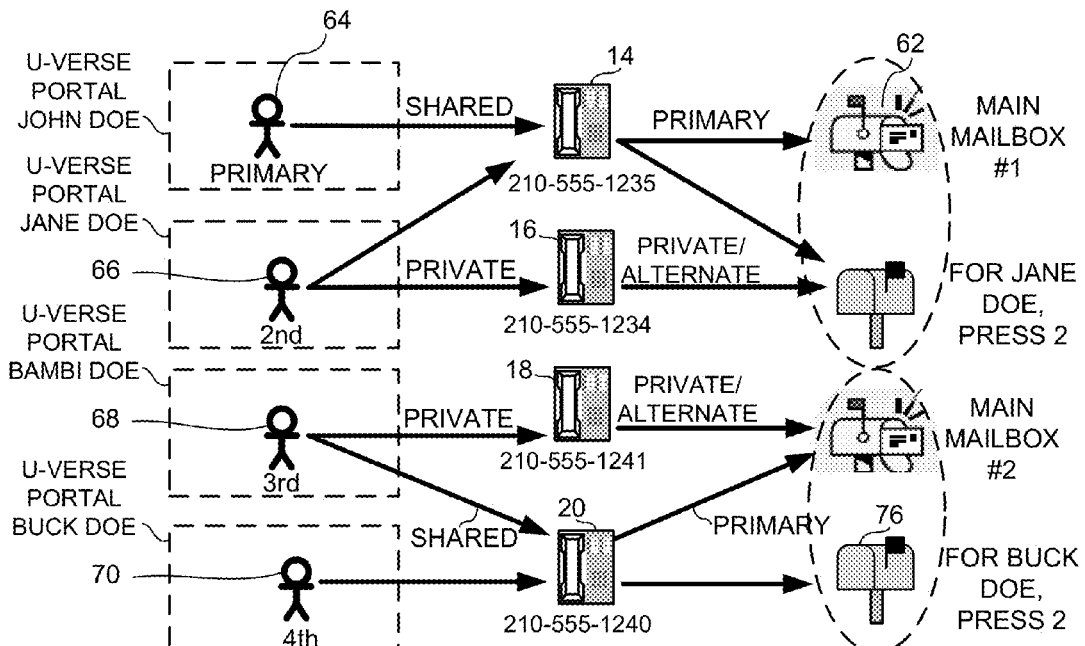
FIG. 2B is a block diagram of the example customer premises in FIG. 2A after an example configuration entered by a customer using an example customer premises telephone system set up interface.

FIG. 2B is a block diagram of the example customer premises 22 after one example set up of the phones 14, 16, 18 and 20 has been performed by the head of the household such as the person 64. In this example, the phones 14, 16, 18 and 20 have been configured to access different voicemail boxes and to be shared among different people. The new configuration shown in FIG. 2B allows the person 64 to share access to the phone 14 with the person 66. The common voicemail box 62 has been configured to be accessible from the phone 14 for the persons 64 and 66. A new secondary voicemail box 72 has been set up. The person 66 now has access to the phone 14 as well as private access to the phone 16. Both the phone 14 and phone 16 have been configured to allow access to the secondary voicemail box 72 for use by the person 66.

The person 68 has private access to the phone 18 and private access to a new configured common voicemail box 74. The phone 20 has been configured to allow the person 68 and the person 70 to have access to the phone 20. The phone 20 has been configured to allow access to the common voicemail box 72 for the person 70. The phone 20 allows access to a new secondary voicemail box 76 for the person 70. Further, different phone services may be enabled for the phones 14, 16, 18 and 20 which are accessible to the different users 64, 66, 68 and 70 on supplying their account information.

Figure 3:
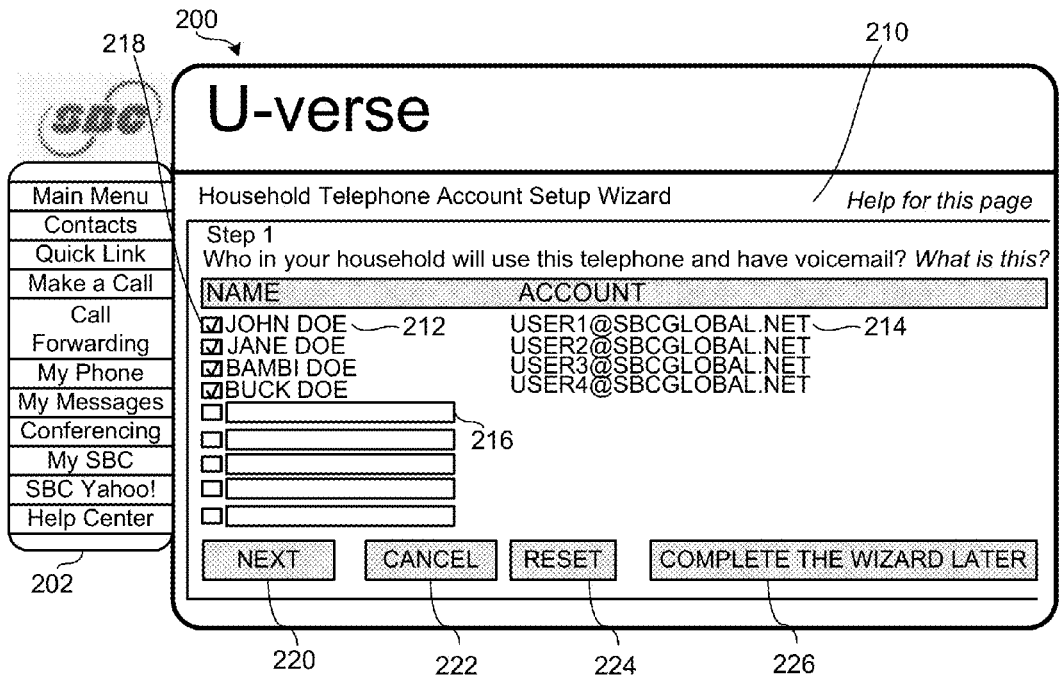
FIG. 3 is a screen shot of the first screen of the example customer premises telephone system set up interface.

FIG. 3 is a screen shot of an example of a customer interface 200 generated by the example VoIP service provider portal 52 and displayed for a customer on a web browser enabled device such as the example personal computer 58 in FIG. 1. The personal computer 58 in FIG. 1 may be located in the customer premises 22 in FIG. 1 or may be off site. The customer interface 200 is accessible by a customer who is responsible for the customer account such as the person 64 in FIG. 2A via entry of a user identification and password or other security verification. The user interface 200 allows the customer to configure the telephones and services at the customer premises 22 via commands to the IMS core 36 to control access to phones and/or voicemail boxes which are associated with the customer account. It is to be understood that other adjustments and information such as service requests, billing, quality of service reporting, etc. may be made via the VoIP service provider portal 52 on the customer interface 200 or similar interfaces.

The customer interface 200 is a graphical user interface that includes a main menu options area 202 containing different options for other customer services and/or display of customer account information. The user interface 200 includes a user selection window 210. The user selection window 210 includes a name column 212 and an account identifier column 214. The name column 212 lists the names of the users (persons 64, 66, 68 and 70) in the customer premises 22 and the account identifier column 214 lists an account identifier such as an e-mail address associated with each person. The interface 200 obtains the user names and account identifiers from the database server 44 via the portal 52. The name column 208 initially lists the names of the user who is responsible for the customer account and a series of blank name fields 216. The user may enter the name or names of additional users, for example members of the household in the customer premises 22 in the fields blank 216. These names and their associated account identifiers will be displayed in the account identifier column 214. A check box 218 allows the customer to select the user name(s) of the user(s) who will use the telephones and have access to a voicemail box. The initial set up window area 204 also includes a next button 220, a cancel button 222 and a reset button 224 to navigate throughout the different windows which will be detailed below. Selecting the next button 220 will cause the customer interface 200 to display the next configuration window such as a phone number set up window 250 in FIG. 4. Selecting the cancel button 222 will cause the entered information in the window to be erased. Selecting the reset button 224 will cause the fields to revert to the previous setting. A complete later button 226 allows the customer to complete the configuration at a later point in time.

Figure 4:
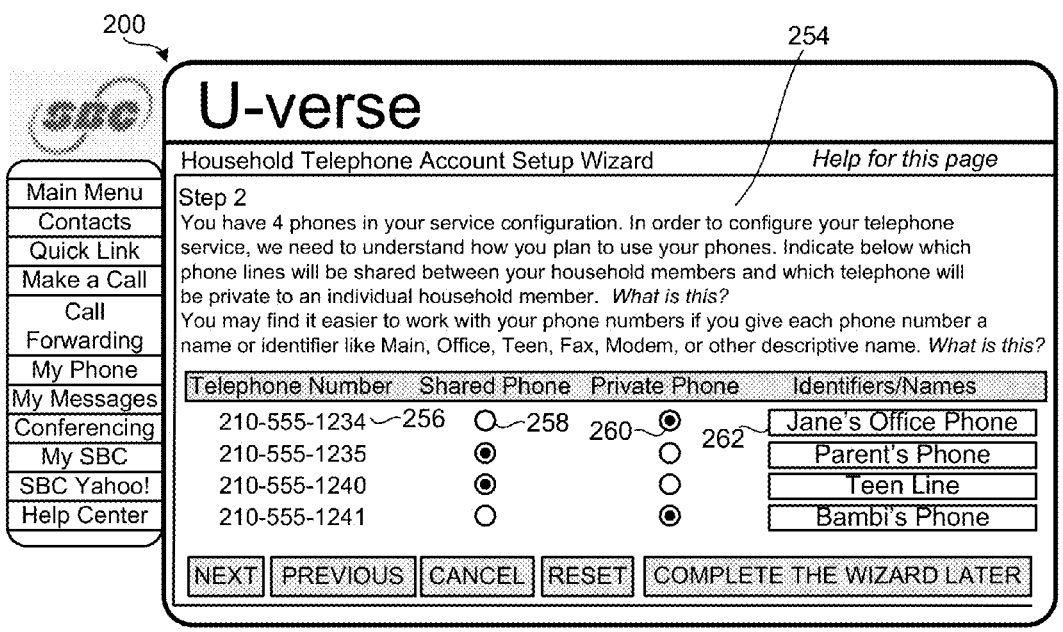
FIG. 4 is a screen shot of an example interface screen for selecting users in the customer premises telephone system set up interface.

FIG. 4 shows an example phone number set up window 250 that is displayed in the customer interface 200 after the names of the users are entered in the user selection window 210 in FIG. 3. The user interface 200 also includes a previous button 228 which, when selected, returns to the previous configuration window (user selection window 210 in this example). The phone number set up window 250 includes an instruction area 254 including instructions to the user and/or information regarding the phone numbers that are associated with the account. The information regarding the phone numbers and phones is taken from the database server 44. In this example, the instruction area 254 indicates there are four phones and associated numbers with the customer account. A telephone number column 256 lists the phone numbers that are associated with the account. The listing of telephone numbers may be telephone numbers associated with household telephones (e.g., landline telephones), VoIP telephones, and/or mobile telephones. Each of the listed phone numbers has a shared button 258 and a private phone button 260. By selecting the shared button 258 for the each of the listed phone numbers, the customer may designate the phone associated with the phone number in the telephone number column 256 as associated with multiple users. By selecting the private phone button 260 for each of the listed phone numbers, the customer may designate the phone associated with the phone number in the telephone number column 256 as associated with a single user. Each telephone number also has an associated text field 262 which may be filled in by the customer to identify or describe each phone number. For example, a phone number may be described by the location of the associated phone.

Figure 5A:
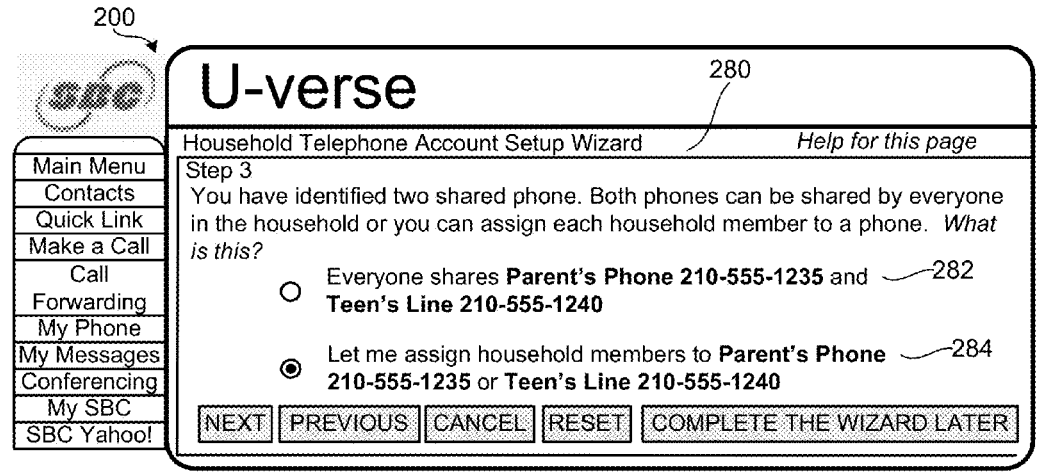
FIGS. 5A-5C are screen shots of example interface screens for assigning phones to users as shared or private phones in the customer premises telephone system set up interface.
Figure 5B:
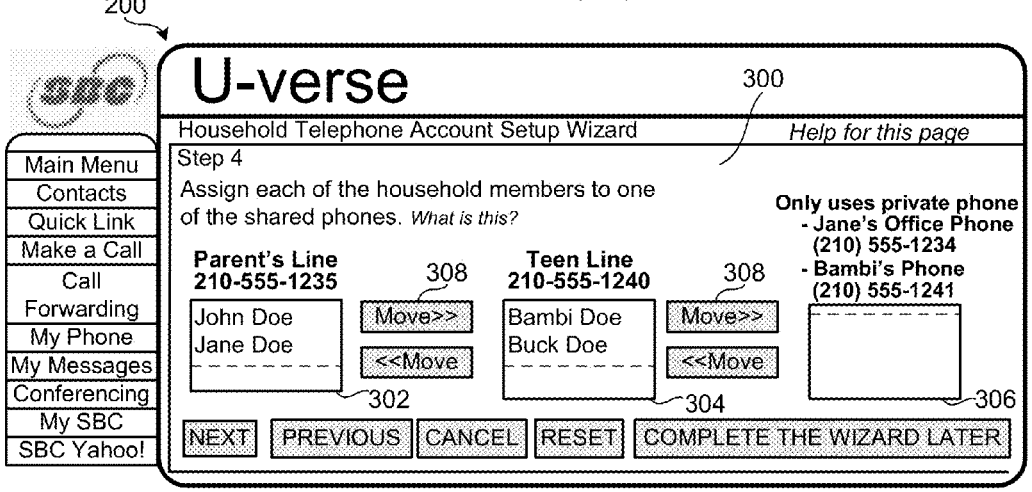
Figure 5C:
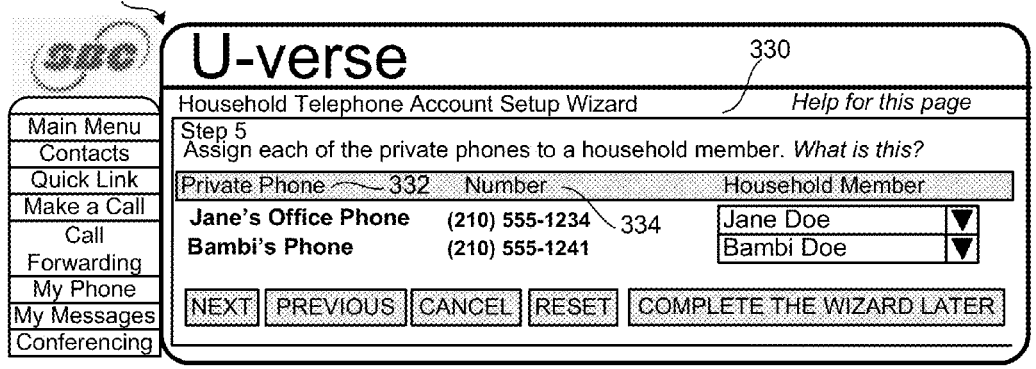

If the user selects any phone number which will be a shared number, a series of configuration windows are displayed as shown in FIGS. 5A-5C by the customer interface 200. FIG. 5A shows a sharing configuration window 280 which includes an all share option 282 and an assignment option 284. The all share option 282 configures all the shared numbers to all users in the household. Selecting the assignment option 284 results in the display of a user sharing configuration window 300 as shown in FIG. 5B in the customer interface 200.

The user sharing configuration window 300 in FIG. 5B includes a main number user list field 302, a second number user list field 304 and a third number user list field 306. Initially, the main number user list field 302 has a list of all the users associated with the customer account. The user list field 302 and the user list field 304 are each associated with a phone number which the user had previously designated as shared in the phone number set up window 250 in FIG. 4. The user list field 306 is associated with the phone numbers which the user had previously designated as private in the phone number set up window 250. By using a move button 308, the user may assign a particular user to a particular list field such as the user list field 304 and thereby give that user sharing privileges to that phone. The user list field 306 lists users which will be assigned a private phone.

FIG. 5C shows a private phone set up window 330 in the customer interface 200. The private phone set up window 330 has a private phone column 332 listing all the phones that were designated as private in the phone set up window 250 in FIG. 4. The private phone set up window 330 includes a telephone number column 334 which lists the respective phone numbers next to the phones in the private phone column 332. A user pull down menu field 336 is located next to each of the phone numbers in the telephone number column 334. The user pull down menu 336 includes each user name in the customer premises 22 which was designated as a private phone user in the user sharing configuration window 300 in FIG. 5B. The customer selects the user name to be associated with the listed private phone from the user pull down menu 336.

Figure 6A:
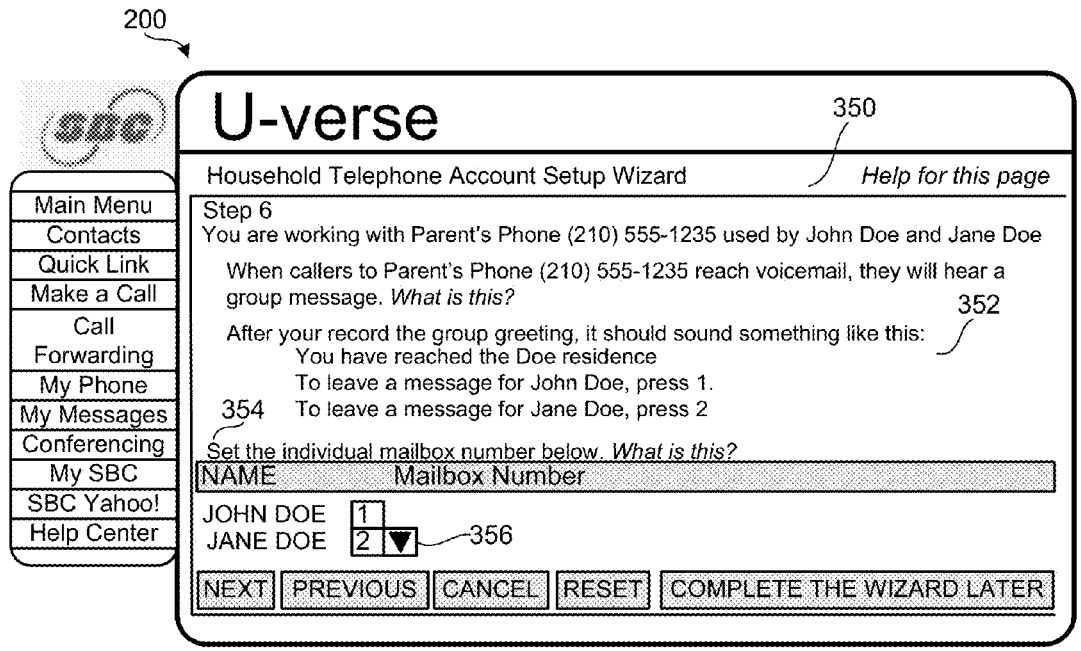
FIGS. 6A-6C are screen shots of example interfaces that allow a user to record a voicemail greeting in the customer premises telephone system set up interface.

FIG. 6A shows an example general voicemail box set up window 350 which is displayed by the user interface 200 after the initial names of users are entered. The voicemail set up window 350 includes an instruction area 352 which includes instructions on setting up a voicemail message and the identification of the phone number to which the voicemail box is being assigned. A name column 354 lists the names of the users entered in the phone number set up window 350 in FIG. 4 above. The first name is the user who is responsible for the customer account and assigned to the first voicemail box. Each following name includes an associated pull down menu 356 which includes the mail box numbers available. The customer assigns a mailbox number to the names by selecting the mail box number in the pull down menu 356.

Figure 6B:
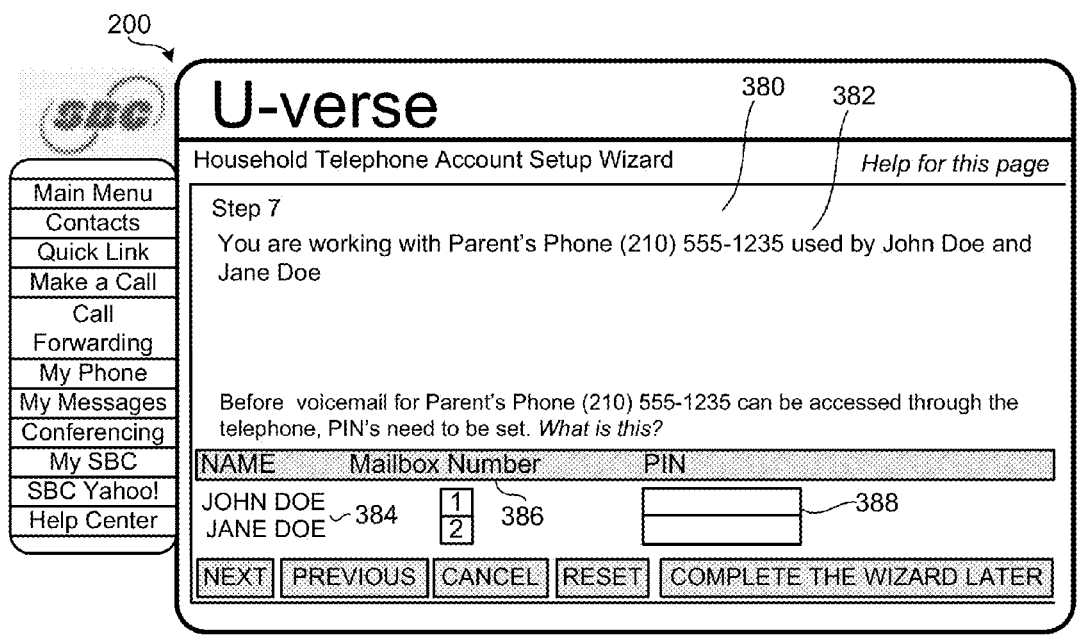

FIG. 6B shows an example voicemail identification set up window 380 which is displayed by the customer interface 200 after the mailboxes are assigned in the voicemail box general set up window 350 in FIG. 6A. The voicemail identification set up window 380 includes an information area 382 which indicates the phone number of the voicemail box which is being set up. The window 380 includes a name column 384 and a mail box column 386. The name column 384 shows the names of users and associated mail boxes in the mail box column 386. Each mail box listing has a personal identification (PIN) number field 388 which allows the customer to enter a PIN for accessing the associated voicemail box.

Figure 6C:
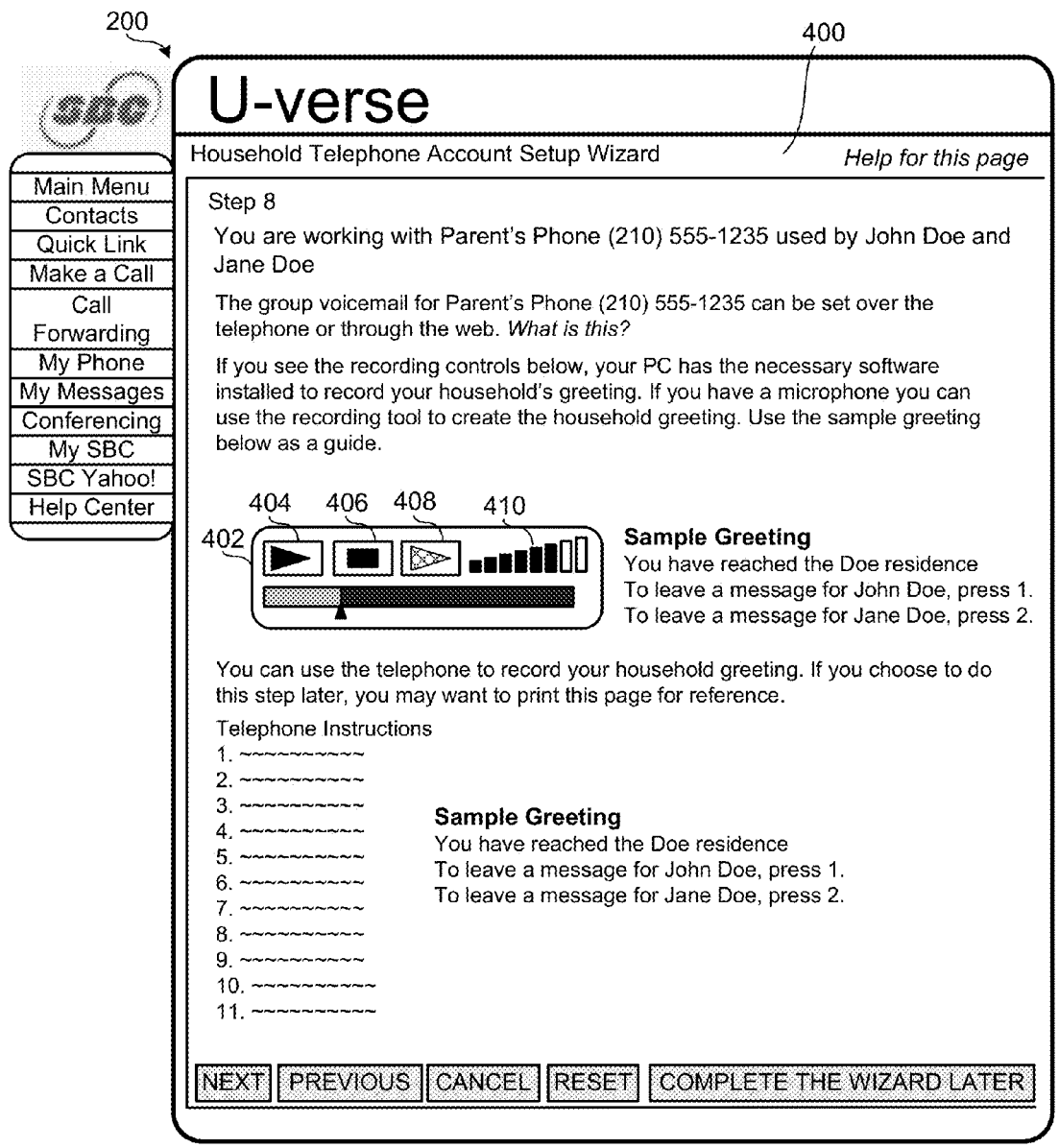

FIG. 6C shows a voicemail message set up window 400 which is displayed to a customer assuming that the personal computer has a microphone for recording a message to be stored with the associated mailbox at the media content server 44 in FIG. 1. The voicemail message set up window 400 has a set of recording controls 402 which enable a user to input a voicemail message to an attached microphone. The set up window 400 includes instructions regarding entry of a voicemail greeting by computer entry and by phone entry. The set up window 400 also indicates the phone number associated with the voicemail box. The recording controls include a record symbol 404, a stop symbol 406, a play symbol 408, a volume slider 410 and a time slider 412. Selecting the record symbol 404 enables the microphone to record a message for association with the mail box. The stop symbol 406 stops the recording. The play symbol 408 plays the message recording. The time slider 412 allows for the playback of the recorded message.

Those of ordinary skill in the art will understand that other features and services including, for example, long distance service, 1-900 numbers, ringtones, call forwarding and conference calling, may be configured for the users such as the users 66, 68 and 70 by the primary account holder such as the user 64 via input screens similar to those in FIGS. 5-6. For example, features and services may be made available to a particular user. Other features and services may be made available and the particular user may be given the ability to configure the feature and/or service to their own personal preference using their account information. For example, if a user is given the option for a different ringtone, the user can adjust the ringtone via their customer identification.

Figure 7:
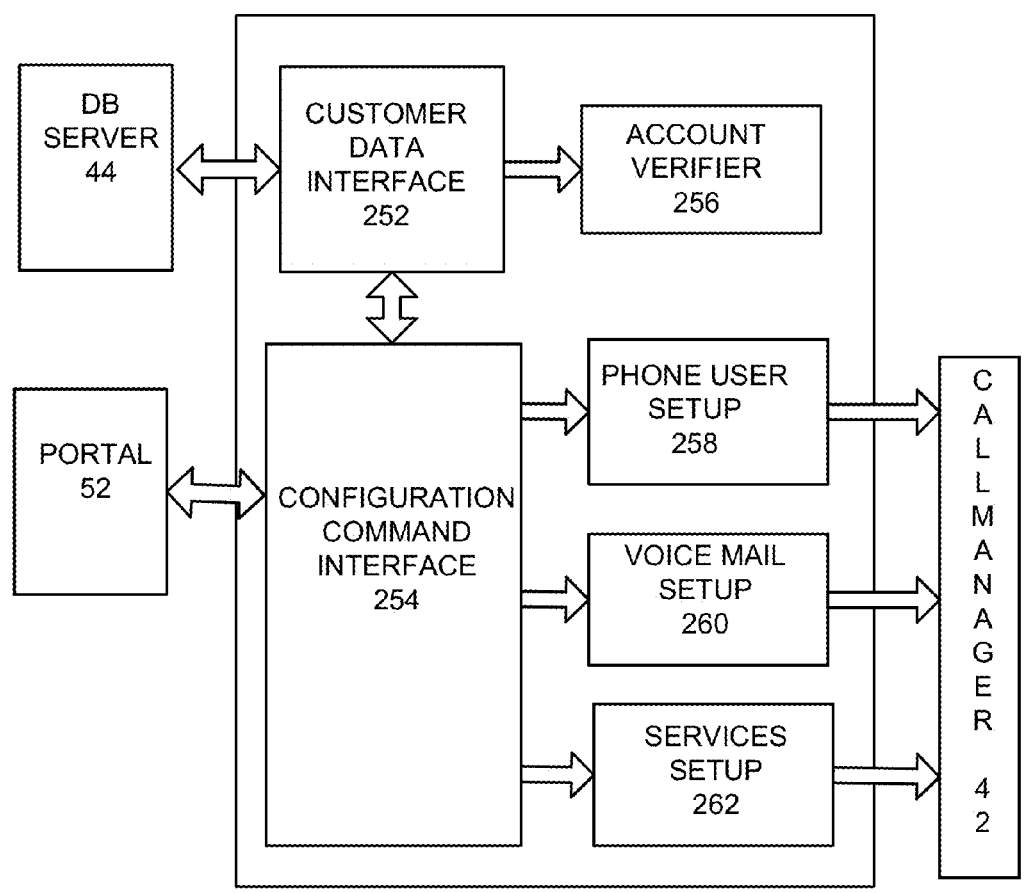
FIG. 7 is a block diagram illustrating an example apparatus to implement the configuration entered by a customer using the example customer premises telephone system set up interface.

FIG. 7 is a block diagram of an example apparatus 450 to implement the configuration provided by the customer via the user interface 200 shown in FIGS. 3-6. The apparatus 450 may, for example, be implemented by a logic circuit in communication with or integral to the IMS core 36, or may be implemented by software and/or firmware executed by components of the IMS core 36 such as the call server 40 and/or the call manager 42. The example apparatus 250 includes a customer data interface 252, a configuration command interface 254, an account verifier 256, a phone user setup module 258, a voice mail setup module 260 and a service setup module 262. The customer data interface 252 exchanges data with the database server 44 and is coupled to the configuration command interface 254 and the account verifier 256. The configuration command interface 254 exchanges data from a web portal such as the VoIP service provider portal 52 and sends configuration data to the phone user setup module 258, the voice mail setup module 260 and the service configuration module 262. The phone user setup module 258, the voice mail setup module 260 and the service configuration module 262 all configure phone service via the call manager 42 in accordance to customer configurations entered via the user interface 200 shown in FIGS. 3-6.

Figure 8A:
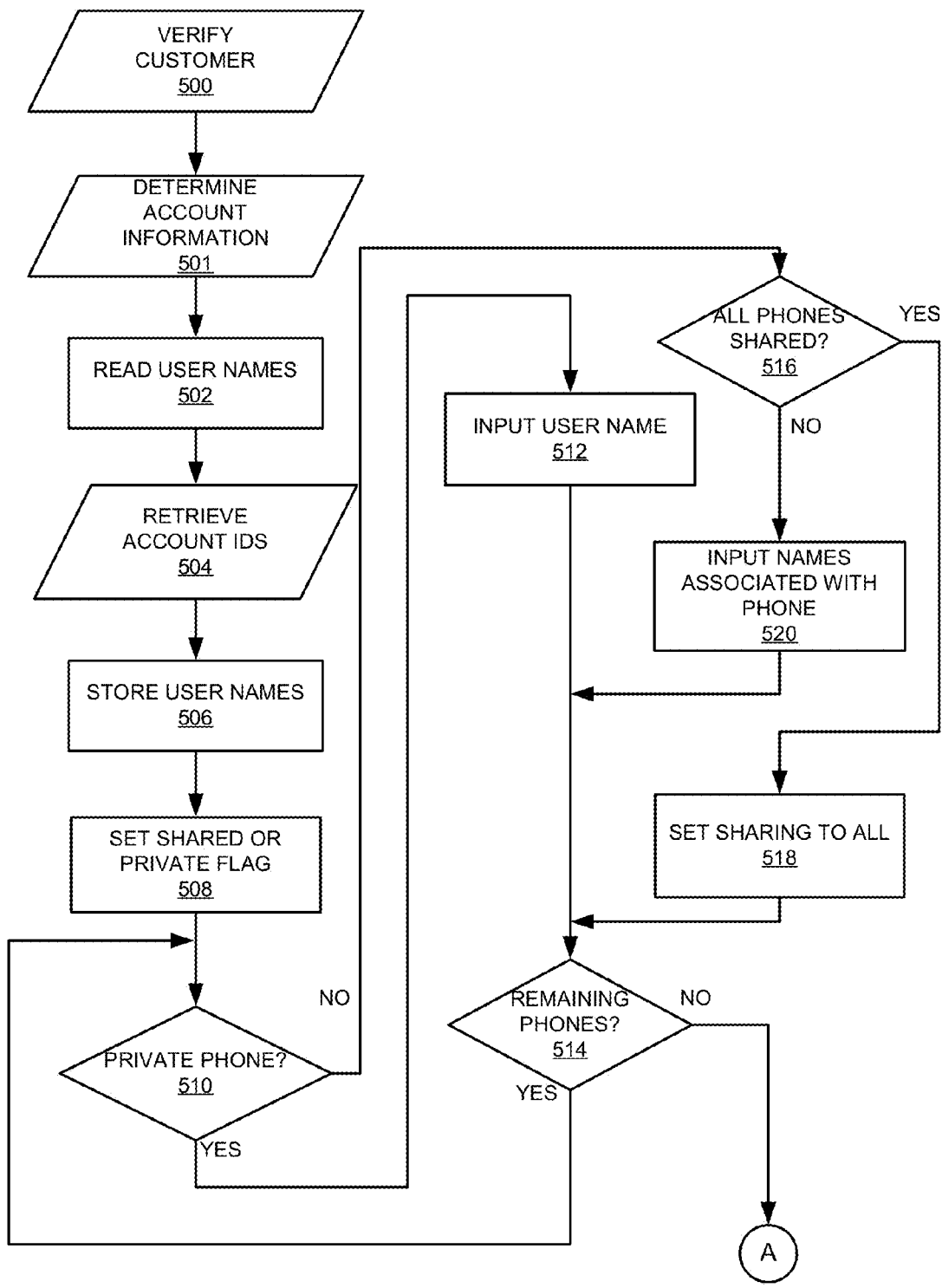
FIGS. 8A-8B are flow diagrams of an example process followed by certain components of the telephone system such as the example apparatus of FIG. 7 to implement the configuration entered by a customer using the example customer premises telephone system set up interface.
Figure 8B:
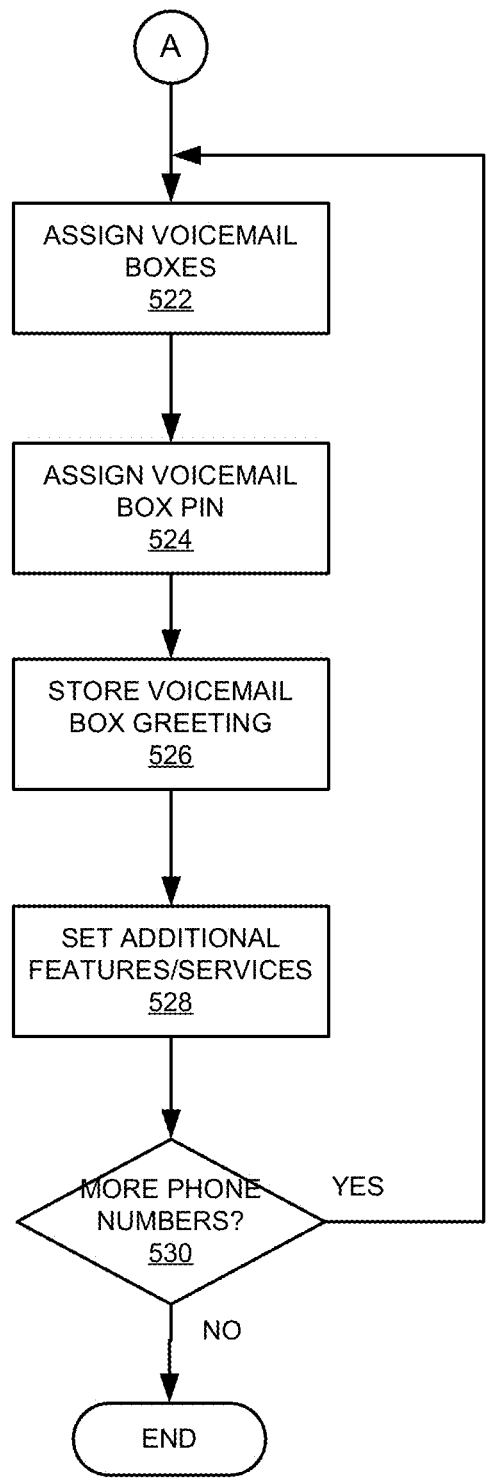

FIGS. 8A-8B are flow diagrams of an example process used in response to the user interface 200 shown in FIGS. 3-6 by the apparatus 450 of the IMS core 36 to configure the call server 40 and call manager 42 for the VoIP phones of a customer account such as that of the customer premises 22 in FIG. 1. The customer first accesses the customer interface 200 described above via the VoIP service provider portal 52. The customer enters identification information including a password which is sent to the account verifier 256 of the apparatus 450 via the portal 52 to authenticate the customer and allow access to the account (block 500). The customer data interface 252 first determines the account information associated with the customer including the number of phones in the premises, the phone numbers associated with the phones and the names of other users associated with the customer account from the database server 44 (block 501). After the portal displays the user selection window 210 in the customer interface 200 in FIG. 3 and the customer selects the user names for the phones, the configuration command interface 254 reads the selected user names (block 502). The customer data interface 252 retrieves account identifications for the selected user names from the database server 44 for the display on the user interface 200 (block 504).

After the customer enters the other user names, the user names are sent from the portal 52 to the configuration command interface 254 and to the database server 44 via the customer data interface 252 to be stored with the account information (block 506). The configuration command interface 254 then begins with the phone numbers in the account and receives the customer selection from the phone number set up window 250 in FIG. 4 to set the phone number as a private phone or a shared phone (block 508). The configuration command interface 254 then determines whether the user has designated a phone as a private phone (block 510). If the phone is a private phone, the customer enters the user name associated with the phone in the private phone set up window 330 in FIG. 5C for the phone user setup module 258 and for storage in the database server 44 via the customer data interface 252 (block 512). The configuration command interface 254 then determines whether there are remaining phones associated with the customer account (block 514). If there are remaining phones, the IMS core 36 loops back to block 510 to record the status of the users of that phone.

If the phone is not a private phone, the configuration command interface 254 determines if the customer has selected the option for all users to share the phone from the sharing configuration window 280 in FIG. 5A (block 516). If the phone is shared, the phone number is set to be shared by all the users associated with the account via the phone user setup module 258 (block 518). If the phone is not shared, the configuration command interface 254 reads the input names associated with the phone as entered by the user in the user sharing configuration window 300 in FIG. 5B and the phone user setup module 258 configures the phone via the call manager 42 (block 520). After the user or users are associated with a phone, the configuration command interface 254 determines whether there are remaining phones to be assigned to users (block 514). If there are remaining phones, the configuration command interface 254 loops back to determine the assigned users for the next phone in block 510.

If all the phones associated with the account have been assigned users and a shared or private designation, the configuration command interface 254 accepts the assignment of voicemail boxes to different users for each phone and the voice mail setup module 260 configures the voice mail via the call manager 42 (block 522). The configuration command interface 254 then accepts the user input of a PIN for each voicemail box from the voicemail identification set up window 380 in FIG. 6B (block 524). The configuration command interface 254 then accepts the input voice message for the mail box from the voicemail message set up window 400 in FIG. 6C and the voice mail setup module 260 configures the voice mail via the call manager 42 (block 526). The customer data interface 252 stores the message in the database server 44 for use by the call manager 42 (block 526). The services setup module 262 then configures other features and/or services, which have been enabled for the different users, via the call manager 42 (block 528). The configuration command interface 254 determines if there are other voicemail boxes (block 530). If there are other remaining voicemail boxes, the configuration command interface 254 loops up to block 522 to assign the next voicemail box. If there are no remaining voicemail boxes, the configuration command interface 254 terminates the set up process.

Figure 9:
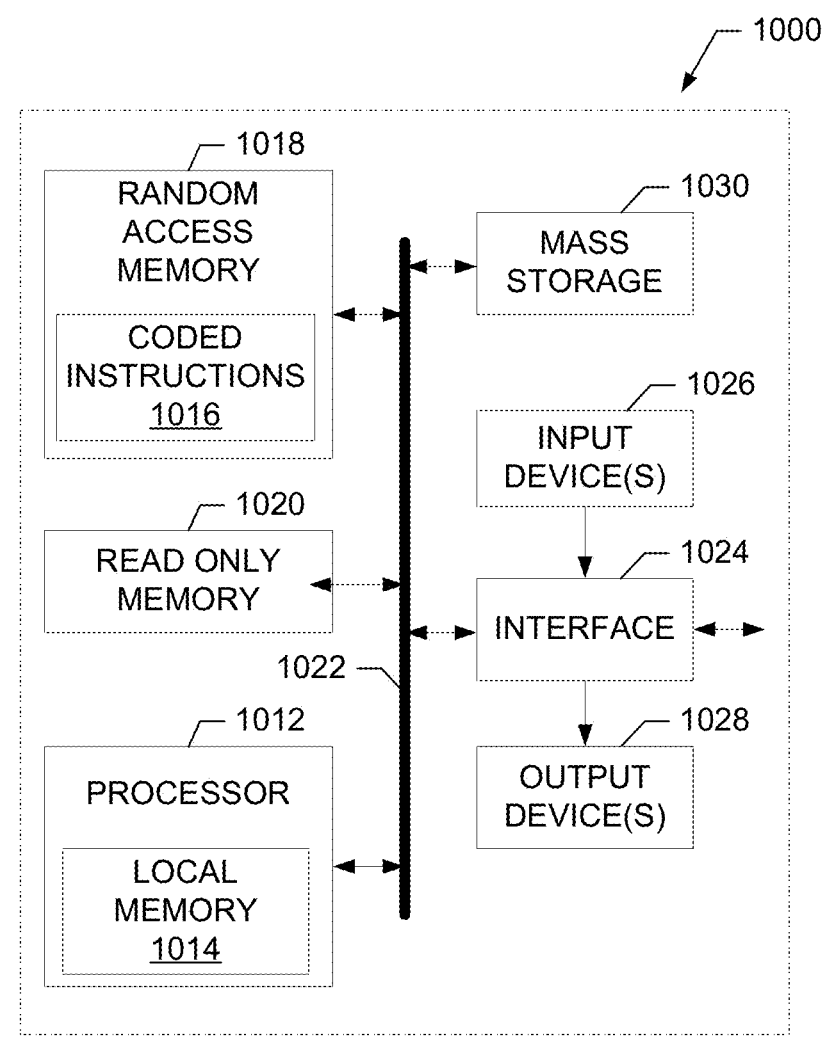
FIG. 9 is an example processor which may be used to implement the example interfaces in FIGS. 3-6 and/or the implementation of the configurations in FIG. 8.

FIG. 9 is a schematic diagram of an example processor platform 1000 which may be used for the personal computer 58 capable of implementing the example machine readable instructions illustrated in FIGS. 3-6. For example, the processor platform 1000 can be implemented by one or more general purpose microprocessors, microcontrollers, etc. The processor platform 1000 of the example includes the processor 1012 that is a general purpose programmable processor. The processor 1012 executes coded instructions present in a memory 1020 of the processor 1012. The processor 1012 may be any type of processing unit, such as a microprocessor. The processor 1012 includes a local memory 1014. The processor 1012 may execute, among other things, the example machine readable instructions illustrated in FIGS. 3-6.

The processor 1012 is in communication with the main memory including a read only memory (ROM) 1020 and/or a RAM 1018 via a bus 1022. The RAM 1018 may be implemented by Synchronous Dynamic Random Access Memory (SDRAM), Dynamic DRAM, and/or any other type of RAM device. The ROM 1020 may be implemented by flash memory and/or any other desired type of memory device. Access to the memory space 1020 and 1018 is typically controlled by a memory controller (not shown) in a conventional manner. The RAM 1018 may be used by the processor 1012 to implement the memory 1020, and/or to store coded instructions 1016 that can be executed to implement the example machine readable instructions illustrated in FIGS. 3-6.

The processor platform 1000 also includes a conventional interface circuit 1024. The interface circuit 1024 may be implemented by any type of well known interface standard, such as an external memory interface, serial port, general purpose input/output, etc. One or more input devices 1026 are connected to the interface circuit 1024. One or more output devices 1028 are also connected to the interface circuit 1024. Additional permanent storage may be offered via a mass storage device 1030 which may be a hard drive. In the illustrated example, a microphone or telephony equipment may be part of the input devices 1026.

At least some of the above described example methods and/or apparatus are implemented by logic, such as one or more software and/or firmware programs running on a computer processor. However, such logic may also include dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state media such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method, comprising:
conveying a graphical interface to a subscriber of a telephone service, wherein the telephone service provides a plurality of telephone numbers to the subscriber, wherein a plurality of users are associated with the subscriber;
providing, via the graphical interface, a first option to designate a first one of the telephone numbers as a private telephone number to which only a first one of the users has access;
providing, via the graphical interface, a second option to designate a second one of the telephone numbers as a shared telephone number to which a second one and a third one of the users have access; and
in response to a selection of the second option:
enabling the subscriber, via the graphical interface, to assign a first private voicemail box accessible via the shared telephone number to only the second one of the users; and
enabling the subscriber, via the graphical interface, to assign a second private voicemail box accessible via the shared telephone number to only the third one of the users.

2. A method as defined in claim 1, further comprising providing, via the graphical interface, an input to receive a first personal information number for the first private voicemail box and a second personal information number for the second private voicemail box.

3. A method as defined in claim 1, further comprising providing, via the graphical interface, a third option to designate a third one of the telephone numbers as a public telephone number to which each of the users has access.

4. A method as defined in claim 1, further comprising storing a greeting for the shared telephone number indicative of the assignment of the first private voicemail box to the second one of the users and the second private voicemail box to the third one of the users.

5. A method as defined in claim 1, wherein conveying the graphical interface to the subscriber comprises providing access to a portal via a network, and wherein the graphical interface is presented on a web browser associated with a device associated with the subscriber.

6. A method as defined in claim 1, further comprising enabling the subscriber, via the graphical interface, to assign a name to respective ones of the telephone numbers.

7. A method as defined in claim 1, wherein the first one of the telephone numbers is associated with a cellular device, and the second one of the telephone numbers is associated with a Voice over Internet Protocol device.

8. A tangible machine readable storage medium comprising instructions that, when executed, cause a machine to perform operations comprising:
conveying a graphical interface to a subscriber of a telephone service, wherein the telephone service provides a plurality of telephone numbers to the subscriber, wherein a plurality of users are associated with the subscriber;
providing, via the graphical interface, a first option to designate a first one of the telephone numbers as a private telephone number to which only a first one of the users has access;
providing, via the graphical interface, a second option to designate a second one of the telephone numbers as a shared telephone number to which a second one and a third one of the users have access; and
in response to a selection of the second option:
enabling the subscriber, via the graphical interface, to assign a first private voicemail box accessible via the shared telephone number to only the second one of the users; and
enabling the subscriber, via the graphical interface, to assign a second private voicemail box accessible via the shared telephone number to only the third one of the users.

9. A tangible machine readable storage medium as defined in claim 8, wherein the operations further comprise providing, via the graphical interface, an input to receive a first personal information number for the first private voicemail box and a second personal information number for the second private voicemail box.

10. A tangible machine readable storage medium as defined in claim 8, wherein the operations further comprise providing, via the graphical interface, a third option to designate a third one of the telephone numbers as a public telephone number to which each of the users has access.

11. A tangible machine readable storage medium as defined in claim 8, wherein the operations further comprise storing a greeting for the shared telephone number indicative of the assignment of the first private voicemail box to the second one of the users and the second private voicemail box to the third one of the users.

12. A tangible machine readable storage medium as defined in claim 8, wherein conveying the graphical interface to the subscriber comprises providing access to a portal via a network, and wherein the graphical interface is presented on a web browser associated with a device associated with the subscriber.

13. A tangible machine readable storage medium as defined in claim 8, wherein the operations further comprise enabling the subscriber, via the graphical interface, to assign a name to respective ones of the telephone numbers.

14. An apparatus, comprising:
a memory comprising machine readable instructions; and
a processor to execute the machine readable instructions to perform operations comprising:
conveying a graphical interface to a subscriber of a telephone service, wherein the telephone service provides a plurality of telephone numbers to the subscriber, wherein a plurality of users are associated with the subscriber;
providing, via the graphical interface, a first option to designate a first one of the telephone numbers as a private telephone number to which only a first one of the users has access;
providing, via the graphical interface, a second option to designate a second one of the telephone numbers as a shared telephone number to which a second one and a third one of the users have access; and
in response to a selection of the second option:

enabling the subscriber, via the graphical interface, to assign a first private voicemail box accessible via the shared telephone number to only the second one of the users; and enabling the subscriber, via the graphical interface, to assign a second private voicemail box accessible via the shared telephone number to only the third one of the users.

15. An apparatus as defined in claim 14, wherein the operations further comprise providing, via the graphical interface, an input to receive a first personal information number for the first private voicemail box and a second personal information number for the second private voicemail box.

16. An apparatus as defined in claim 14, wherein the operations further comprise providing, via the graphical interface, a third option to designate a third one of the telephone numbers as a public telephone number to which each of the users has access.

17. An apparatus as defined in claim 14, wherein the operations further comprise storing a greeting for the shared telephone number indicative of the assignment of the first private voicemail box to the second one of the users and the second private voicemail box to the third one of the users.

18. An apparatus as defined in claim 14, wherein conveying the graphical interface to the subscriber comprises providing access to a portal via a network, and wherein the graphical interface is presented on a web browser associated with a device associated with the subscriber.

19. An apparatus as defined in claim 14, wherein the operations further comprise enabling the subscriber, via the graphical interface, to assign a name to respective ones of the telephone numbers.

20. An apparatus as defined in claim 14, wherein the first one of the telephone numbers is associated with a cellular device, and the second one of the telephone numbers is associated with a Voice over Internet Protocol device.

\* \* \* \* \*